United States Patent [19]
Parks et al.

[11] Patent Number: 5,384,788
[45] Date of Patent: Jan. 24, 1995

[54] APPARATUS AND METHOD FOR OPTIMAL ERROR CORRECTING CODE TO PARITY CONVERSION

[75] Inventors: Terry J. Parks, Round Rock; Darius D. Gaskins, Austin, both of Tex.

[73] Assignee: Dell USA, L.P., Austin, Tex.

[21] Appl. No.: 966,235

[22] Filed: Oct. 26, 1992

[51] Int. Cl.⁶ ............................................. G06F 11/10
[52] U.S. Cl. .................................. 371/37.7; 371/37.6; 371/49.2
[58] Field of Search ................. 371/37.7, 37.6, 38.1, 371/40.2, 40.4, 49.1, 49.2

[56] References Cited

U.S. PATENT DOCUMENTS

| | | | |
|---|---|---|---|
| 4,862,462 | 8/1989 | Zulian | 371/37.7 |
| 5,027,357 | 6/1991 | Yu et al. | 371/37.7 |
| 5,182,752 | 1/1993 | DeRoo et al. | 371/37.7 |

Primary Examiner—Vincent P. Canney
Attorney, Agent, or Firm—James Huffman

[57] ABSTRACT

This invention relates to the general area of data integrety in digital computers. In particular it relates to digital computer systems having parity checked systems busses and ECC checked memory. This invention increases the performance of such systems by reducing the memory latency incurred in the ECC to parity conversion process.

9 Claims, 4 Drawing Sheets

APPARATUS AND METHOD FOR OPTIMAL ERROR CORRECTING CODE TO PARITY CONVERSION

CROSS-REFERENCE TO RELATED APPLICATIONS

This application is related to the following U.S. Patent Applications: Ser. No. 07/516,628 titled: "Digital Computer Having an Error Correction Code (ECC) System with Comparator Integrated into Re-Encoder" by Longwell, et al. filed: Apr. 30, 1990; Ser. No. 07/516,894 titled: "Minimized Error Correction Bad Bit Decoder" by Longwell, et al. filed: Apr. 30, 1990; and Ser. No. 07/516,606 titled: "Shared Logic for Error Correction Syndrome Encoding" by Longwell, et al. filed: Apr. 30, 1990.

BACKGROUND OF THE INVENTION

1. Field of the Invention

This invention relates to the general area of data integrity in digital computers. More specifically it relates to reliable systems which use parity on a system data bus and error correcting code (ECC) memory.

2. Description of the Related Art

Parity checking is a method of verifying the integrity of digital data in a computer system. Parity checking is used to verify correct transmission of digital data over a system data bus which connects components of the computer system.

Parity checking is typically implemented by adding a single bit, called a "parity bit", to every byte (eight bits) of data transmitted on the system data bus, thus forming a nine bit parity word. This parity bit is used to "set" the total number bits in the nine bit parity word that are equal to "1" to an even or odd value. Even parity systems set the parity bit equal to "1" if there are an odd number of "set" bits in the associated byte. If there are an even number of bits equal to"1" in the associated byte, the parity bit is set to "0". This insures that there will always be an even number bits set equal to "1" within the nine bit parity word. Odd parity checking is implemented in an opposite manner.

Parity checking allows detection of an odd number of data transmission errors. Thus, if one of the bits in the nine bit parity word is transposed (from "1" to "0" or "0" to "1") during transmission, the total number of bits set equal to "1" will no longer be even or odd whichever it was originally, and the error can thus be detected. Although parity checking allows the detection of an odd number of errors, it does not allow correction of errors.

Error correcting codes (ECC) is a method of adding enough redundancy to a digital data word to allow the word to be reconstructed if one of its bits is errantly modified. ECC is typically used in large memory systems which have millions or billions of bits. In such systems, even with very low bit error rates, the number of bits present makes the probability of a bit error high.

ECC is typically implemented by adding seven bits to a thirty-two bit data word. These seven bits are called a syndrome. By adding the syndrome to a thirty-two bit data word it is possible to correct all single bit errors and detect all two bit errors. This is well known in the art and described in detail in the Bell System Technical Journal Volume XXIX, April 1950, Number 2 entitled "Error Detecting and Correcting Codes" by R. W. Hamming.

In order to make a computer system reliable, it is desirable to provide parity checks on the data which is transferred across the system bus. It is also desirable to provide ECC checks on the memory. In some instances, it is therefore required to convert from ECC syndrome to parity checking and back.

A problem associated with converting from ECC to parity checking is that an ECC checker/correcter can modify data words read from memory to correct single bit errors, and the parity on the system data bus must be generated from these corrected data words. Current systems perform the operations of ECC error checking and correction parity generation sequentially. The ECC unit checks and corrects the memory read data and the parity generation unit then generates parity on the corrected data for transmission onto the system bus. This serial operation takes a long time to perform and increases the memory latency which is the amount of time the system requires to access memory. Increasing memory latency always reduces the performance of the system.

The present invention overcomes this performance problem by utilizing a computer system to correct single bit errors in data words in parallel with the generation of appropriate parity bits.

SUMMARY OF THE INVENTION

The present invention provides a computer system having ECC memory and a parity checked system data bus. The computer system includes means for operatively coupling ECC memory data onto the parity checked system bus. The means for coupling the ECC memory data onto the system bus includes means for checking and correcting the ECC memory data, means for generating parity data from the uncorrected ECC memory data, and means for correcting the generated parity data when an error was detected and/or corrected by the checking and correcting means.

Accordingly, it is a feature of the present invention to provide a computer system with an error correcting memory system and a parity checked system bus.

It is another feature of the present invention to provide a circuit which decreases memory latency by performing the error correction and parity generation in parallel, at the same time.

It is yet another feature of the present invention to correct the generated parity bit in cases where an error is detected and/or corrected.

It is an object of the present invention to provide an apparatus and method of decreasing memory latency in systems with ECC memory and parity checked busses by performing the error correction and parity generation in parallel, at the same time; and correcting the generated parity bit in the case when an error was detected and/or corrected.

This and other features and objects will be made evident in the detailed description.

In an illustrative embodiment, a computer system is provided having a system bus electrically connected to a memory system and having data error detection and correction between the memory system and the system bus. The system bus has a data portion and a parity portion. The parity portion represents the parity of the data portion of the system bus. The memory system stores digital words. Each digital word consists of a data portion and an ECC syndrome portion. The syndrome portion represents the syndrome of the data portion of the digital word. The computer system includes an ECC checker/corrector for checking and correcting the data portion of the digital words before they are transmitted to the system bus, a parity generator for generating a parity data output, and a parity correction circuit. The ECC checker/corrector has an input coupled to the memory system to receive the digital words from the memory system, and an output coupled to the data portion of the system bus. The ECC checker/corrector generates at least one error output indicative of whether an error has been corrected. The parity generator has an input coupled to the data portion of the digital word. The parity correction circuit has an input coupled to the parity data output, and an output coupled to the parity portion of the system bus. The parity correction circuit corrects the parity data output when the error output of the ECC checker/corrector indicates a corrected error.

In another embodiment a process for converting ECC checked data having a data portion and a syndrome portion to parity checked data is provided. The process includes the steps of checking the ECC checked data, and simultaneously generating at least one parity bit from the uncorrected data portion of the ECC checked data, and then correcting the bit error as well as the appropriate parity bit when an error has been detected by the first step of the process.

DESCRIPTION OF THE PREFERRED EMBODIMENTS

In the following detailed description the logic of certain portions of a preferred embodiment will be described in VHSIC Hardware Description Language "VHDL". Note: VHSIC is an acronym for Very High Speed Integrated Circuits. VHDL is well known in the art and is an IEEE standard. The IEEE VHDL Language Reference Manual Draft Standard version 1076/B was ratified in December 1987 as: IEEE STD-1076-1987.

Figure 1:
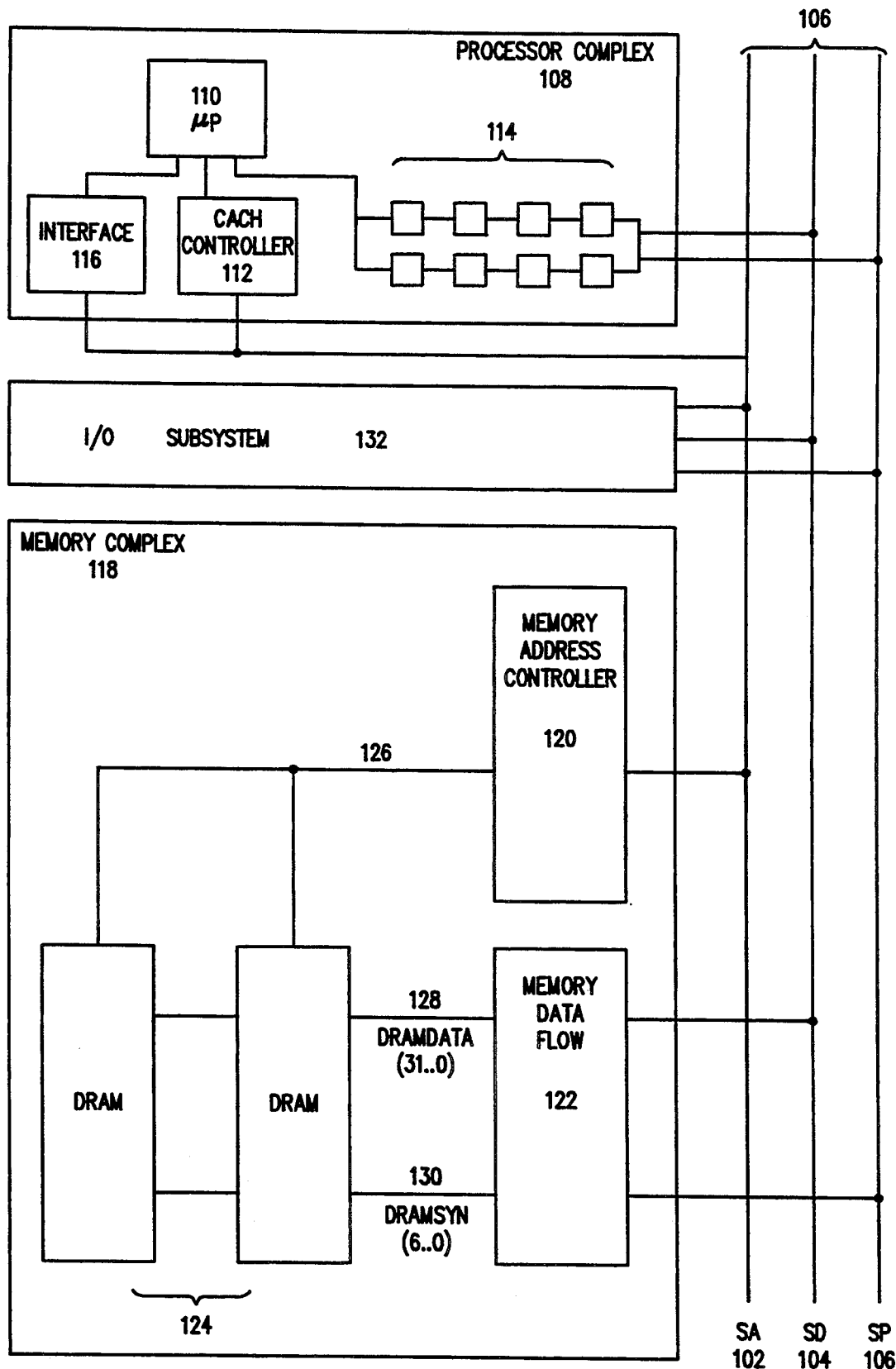
FIG. 1 is a block diagram of the computer system embodying the invention.

Referring to FIG. 1, a computer system 10 is shown which includes a system bus 100, electrically connected to a processor complex 108, an I/O subsystem 132, and a memory complex 118. The system bus 100 contains an address bus SA 102, a data bus SD 104, and a data parity bus SP 106.

The processor complex 108 includes a microprocessor 110 which in a preferred embodiment is an Intel Corporation 80486 processor. The microprocessor 110 is connected to a cache controller 112, a plurality of cache RAMs 114, and an interface 116. The cache controller 112 and the interface 116 are coupled to the microprocessor 110 and the address bus 102. The cache RAMS 114 are coupled to microprocessor 110, the data bus 104, and the parity bus 106.

A memory complex 118 contains a memory address controller 120, a memory data flow 122, and at least one DRAM memory 124 which stores the ECC checked data. The memory address controller 120 is coupled to the address bus 102 and generates DRAM memory address and control signals 126 which are coupled to the DRAM memory 124. ECC checked data is conveyed over two busses, specifically a bus dramdata(31 downto 0) 128 and a bus dramsyn(6 downto 0) 130, from the DRAM memory 124 to the memory data flow 122 where it is converted into parity checked data which is coupled onto the data bus 104 and the parity bus 106.

Figure 2A:
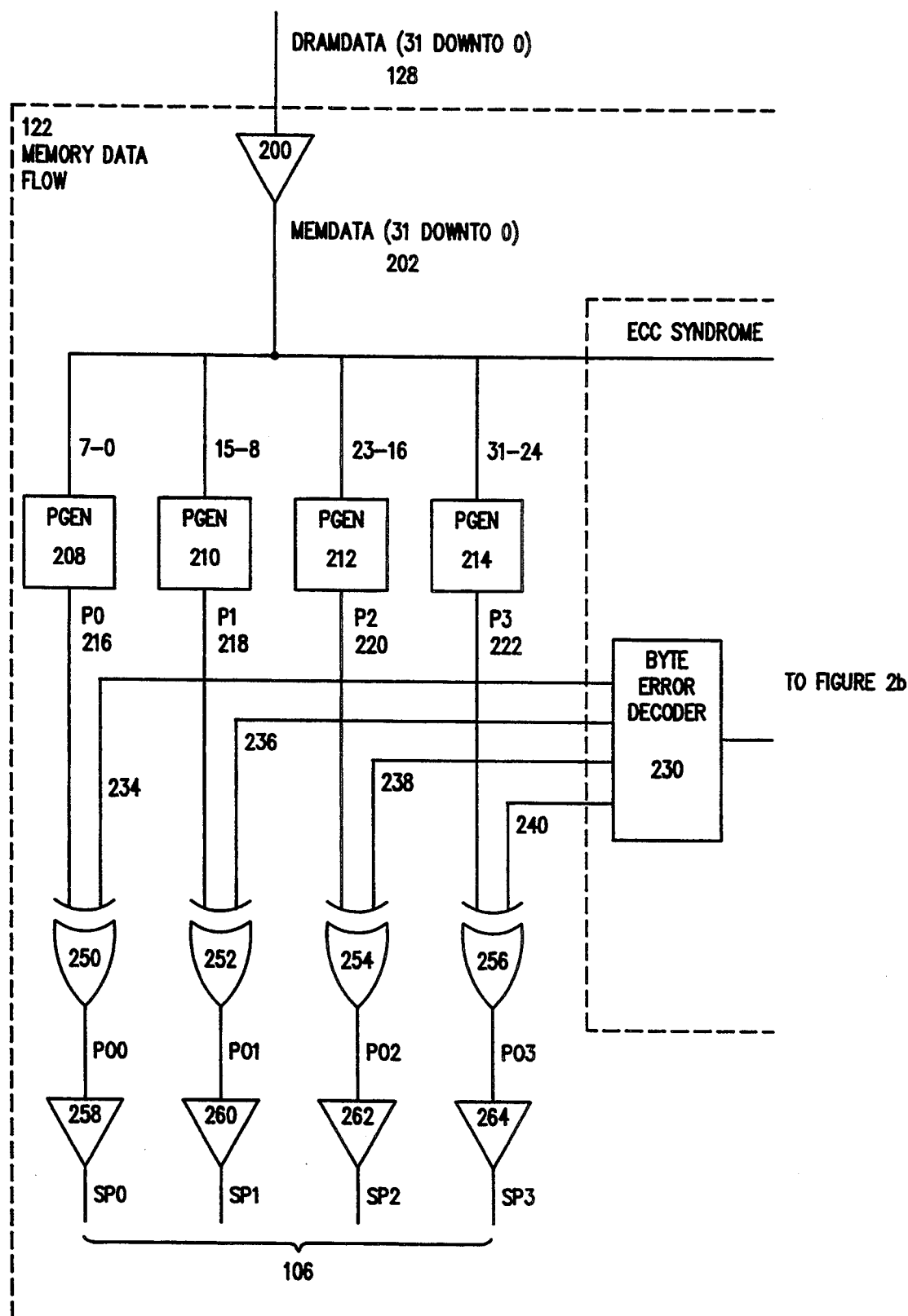
FIG. 2 is a partial block diagram illustrating the read path from memory and the ECC syndrome checked data to parity checked data conversion.
Figure 2B:
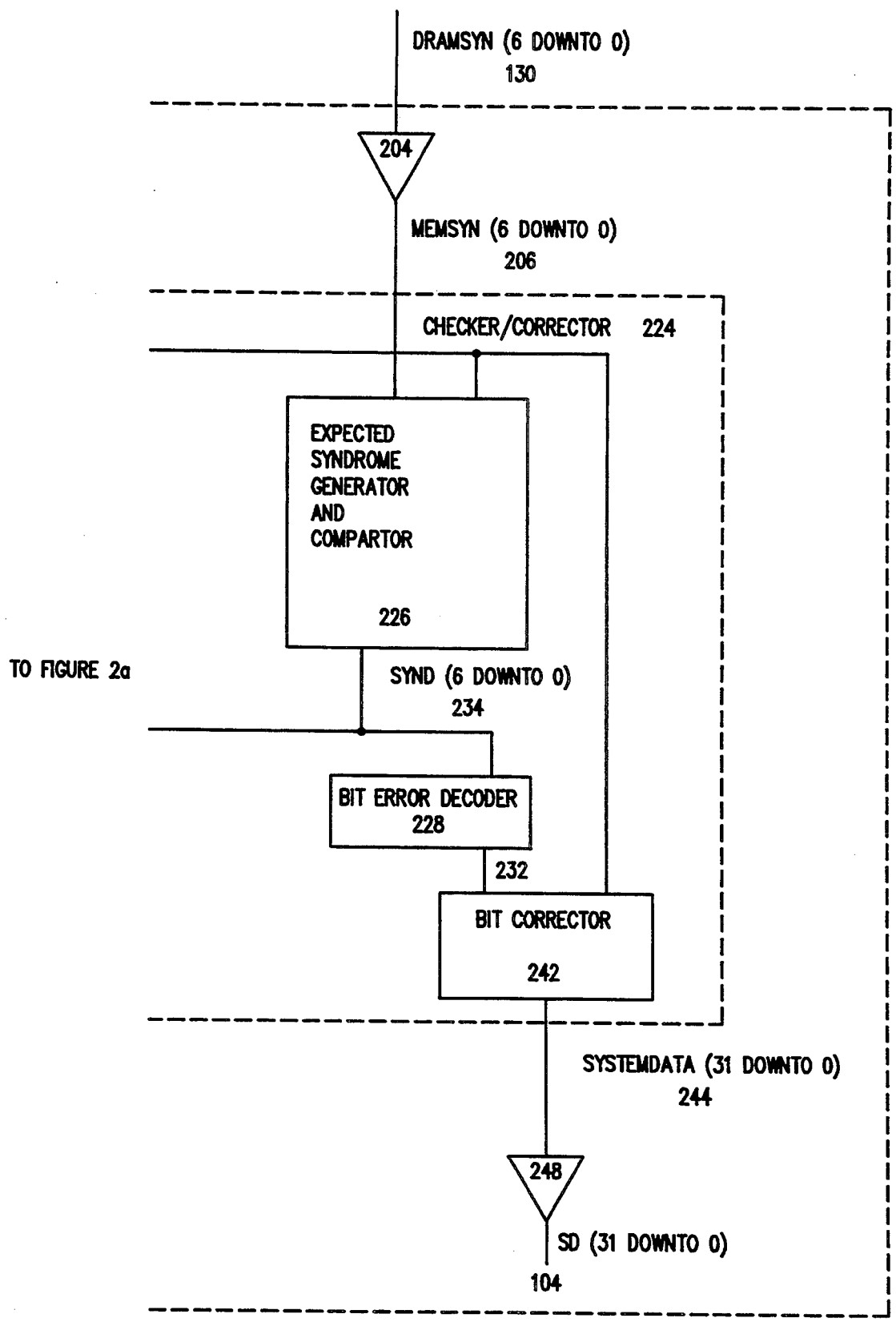

In the system of the current invention, the data in the DRAM memory 124 is protected with ECC codes. The ECC checking and correction occur in the memory data flow 122, and is performed in parallel and simultaneously with the parity generation. A further detail of the read path of the memory data flow 122 is shown in FIG. 2.

Data from the DRAM memory 124 travels over the dramdata(31 downto 0) bus 128 and enters the data flow 122 through a receiver 200 which generates a memdata(31 downto 0) bus 202. Syndrome data from the DRAM memory 124 travels over the dramsyn(6 downto 0) bus 130 and enters the chip through a receiver 204 which generates a memsyn(6 downto 0) bus 206.

A group of four potential parity signals p0 216, p1 218, p2 220, and p3 222 are generated separately for each byte of the memdata bus 202 by four parity generators 208, 210, 212, and 214 respectively.

A VHDL description of the parity generators 208, 210, 212, and 214 is:

p0 ←memdata(0) xor memdata(1) xor memdata(2) xor memdata(3) xor memdata(4) xor memdata(5) xor memdata(6) xor memdata(7);

p1 ←memdata(8) xor memdata(9) xor memdata(10) xor memdata(11) xor memdata(12) xor memdata(13) xor memdata(14) xor memdata(15);

p2 ←memdata(16) xor memdata(17) xor memdata(18) xor memdata(19) xor memdata(20) xor memdata(21) xor memdata(22) xor memdata(23);

p3 ←memdata(24) xor memdata(25) xor memdata(26) xor memdata(27) xor memdata(28) xor memdata(29) xor memdata(30) xor memdata(31).

An ECC syndrome checker 224 which contains an expected syndrome generator and comparator 226, a bit error decoder 228, and a byte error decoder 230; checks the memdata 202 and the memsyn 206 and generates a biterror(31 downto 0) bus 232, and four byte error signals byterror0 234, byterror1 236, byterror2 238, and byterror3 240. This is done in parallel and simultaneously with the generation of the parity by the parity generators 208, 210, 212, and 214.

The expected syndrome generator 226 generates a new syndrome from the data on the memdata(31 downto 0) bus 202, and performs a bit for bit XOR with the memsyn(6 downto 0) bus 206. The output of this XOR is the synd(6 downto 0) bus 234.

A VHDL description of the expected syndrome generation and comparator 226 is:

synd(0) ←memdata(0) xor memdata(1) xor memdata(2) xor memdata(3) xor memdata(4) xor memdata(5) xor memdata(6) xor memdata(7) xor memdata(8) xor memdata(17) xor memdata(19) xor memdata(22) xor memdata(27) xor memdata(29) xor memsyn(0);

synd(1) ←memdata(4) xor memdata(5) xor memdata(6) xor memdata(7) xor memdata(8) xor memdata(9) xor memdata(10) xor memdata(11) xor memdata(12) xor memdata(13) xor memdata(14) xor memdata(15) xor memdata(24) xor memdata(26) xor memdata(30) xor memsyn(1);

synd(2) ←memdata(3) xor memdata(7) xor memdata(12) xor memdata(13) xor memdata(14) xor memdata(15) xor memdata(16) xor memdata(17) xor memdata(18) xor memdata(19) xor memdata(20) xor memdata(21) xor memdata(22) xor memdata(23) xor memsyn(2);

synd(3) ←memdata(0) xor memdata(8) xor memdata(15) xor memdata(20) xor memdata(21) xor memdata(22) xor memdata(23) xor memdata(24) xor memdata(25) xor memdata(26) xor memdata(27) xor memdata(28) xor memdata(29) xor memdata(30) xor memdata(31) xor memsyn(3);

synd(4) ←memdata(1) xor memdata(4) xor memdata(10) xor memdata(11) xor memdata(12) xor memdata(16) xor memdata(17) xor memdata(21) xor memdata(28) xor memdata(29) xor memdata(30) xor memdata(31) xor memsyn(4);

synd(5) ←memdata(2) xor memdata(5) xor memdata(9) xor memdata(10) xor memdata(11) xor memdata(18) xor memdata(19) xor memdata(20) xor memdata(25) xor memdata(26) xor memdata(27) xor memdata(28) xor memsyn(5);

synd(6) ←memdata(0) xor memdata(1) xor memdata(2) xor memdata(3) xor memdata(6) xor memdata(9) xor memdata(11) xor memdata(14) xor memdata(16) xor memdata(18) xor memdata(23) xor memdata(24) xor memdata(25) xor memdata(31) xor memsyn(6).

If the synd(6 downto 0) bus 234 is all zeros, the expected syndrome matched the memsyn(6 downto 0) received from the DRAM memory 124 and there was no error detected. If one or more bits of synd(6 downto 0) 234 are set the bit pattern indicates the bit location that was in error. In the present embodiment this works only for single bit errors, if there were two or more bit errors in the memdata(31 downto 0) bus 202 and memsyn(6 downto 0) bus 206 the bit pattern in synd(6 downto 0) 234 would give an erroneous indication of which bit was defective.

The synd(6 downto 0) bus 234 is decoded by the bit error decoded 228 into the biterror(31 downto 0) bus 232. A VHDL description of the logic which does this is:

biterror(0) ←synd(0) and synd(3) and synd(6);
biterror(1) ←synd(0) and synd(4) and synd(6);
biterror(2) ←synd(0) and synd(5) and synd(6);
biterror(3) ←synd(0) and synd(2) and synd(6);
biterror(4) ←synd(0) and synd(1) and synd(4);
biterror(5) ←synd(0) and synd(1) and synd(5);
biterror(6) ←synd(0) and synd(1) and synd(6);
biterror(7) ←synd(0) and synd(1) and synd(2);
biterror(8) ←synd(0) and synd(1) and synd(3);
biterror(9) ←synd(1) and synd(5) and synd(6);
biterror(10) ←synd(1) and synd(4) and synd(5);
biterror(11) ←synd(1) and synd(4) and synd(6);
biterror(12) ←synd(1) and synd(2) and synd(4);
biterror(13) ←synd(1) and synd(2) and synd(5);
biterror(14) ←synd(1) and synd(2) and synd(6);
biterror(16) ←synd(1) and synd(2) and synd(3);
biterror(16) ←synd(2) and synd(4) and synd(6);
biterror(17) ←synd(0) and synd(2) and synd(4);
biterror(18) ←synd(2) and synd(5) and synd(6);
biterror(19) ←synd(0) and synd(2) and synd(5);
biterror(20) ←synd(0) and synd(2) and synd(3);
biterror(21) ←synd(2) and synd(3) and synd(4);
biterror(22) ←synd(0) and synd(2) and synd(3);
biterror(23) ←synd(2) and synd(3) and synd(6);
biterror(24) ←synd(1) and synd(3) and synd(6);
biterror(25) ←synd(3) and synd(5) and synd(6);
biterror(26) ←synd(1) and synd(3) and synd(5);
biterror(27) ←synd(0) and synd(3) and synd(5);
biterror(28) ←synd(3) and synd(4) and synd(5);
biterror(29) ←synd(0) and synd(3) and synd(4);
biterror(30) ←synd(1) and synd(3) and synd(4);
biterror(31) ←synd(3) and synd(4) and synd(6);

The synd(6 downto 0) bus 234 is also decoded by the byte error decoder 230 into the four byterror(0 to 3) signals 234, 236, 238, and 240 respectively. A VHDL description of the logic which does this is:

byterror(0) ←biterror(0) or biterror(1) or biterror(2) or biterror(3) or biterror(4) or biterror(5) or biterror(6) or biterror(7);

byterror(1) ←biterror(8) or biterror(9) or biterror(10) or biterror(11) or biterror(12) or biterror(13) or biterror(14) or biterror(15);

byterror(2) ←biterror(16) or biterror(17) or biterror(18) or biterror(19) or biterror(20) or biterror(21) or biterror(22) or biterror(23);

byterror(3) ←biterror(24) or biterror(25) or biterror(26) or biterror(27) or biterror(28) or biterror(29) or biterror(30) or biterror(31).

A bit corrector 242 takes as input the biterror(31 downto 0) bus 232 which indicates the bit that has an error, and the memdata(31 downto 0) bus 202. It performs a bit by bit XOR of these two busses. This has the effect of inverting any bit in memdata(31 downto 0) bus 202 which had its corresponding bit in biterror(31 downto 0) bus 232 set, in other words it corrects the bit error and generates the systemdata(31 downto 0) bus 244 which is driven onto the data portion 104 of the system bus 100 by a driver 248.

A group of four XOR gates 250, 252, 254, and 256 receive as inputs the four potential parity signals, p0 216, p1 218, p2 220, and p3 222 respectively; as well as the four byterror signals 234, 236, 238, and 240. The XOR gates 250, 252, 254, and 256 invert the parity bit of any byte in which a byte error was indicated by the byterror signals and generate the output parity signals which are buffered by a group of four drivers 258, 260, 262, and 264 onto the parity portion 106 of the system bus 100.

It should be apparent to those skilled in the art that the data driven onto the parity portion 106 of the system bus 100 is generated from the uncorrected memdata(31 downto 0) 202 instead of the corrected systemdata(31 downto 0) 244. It should also be apparent that the parity generation occurs in parallel with the checking and correction of the data.

Figure 3:
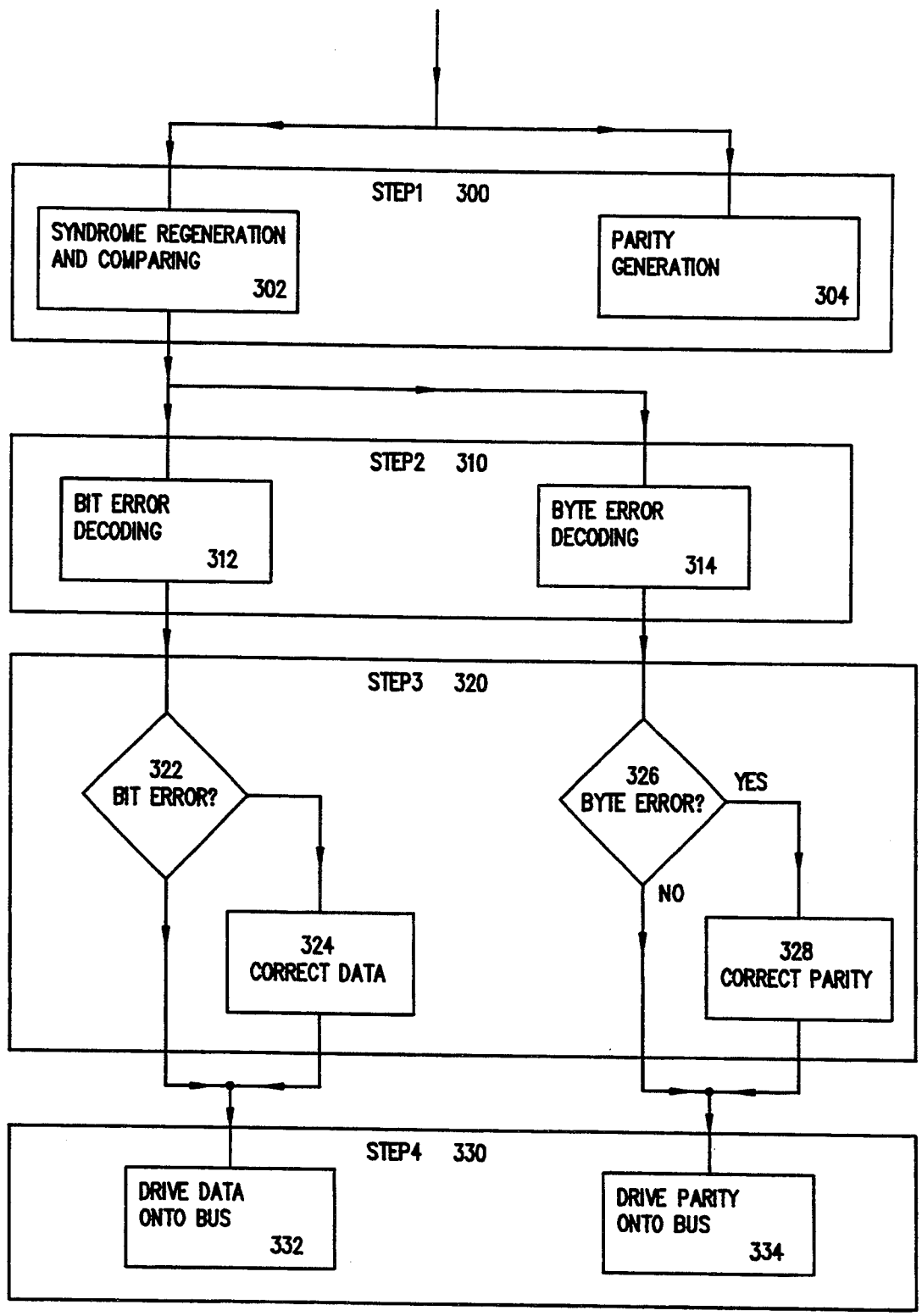
FIG. 3 is a flow chart illustrating the process of ECC syndrome checked data to parity checked data.

Referring to FIG. 3, a process is shown which includes four steps indicated by boxes 300, 310, 320, and 330. The first step 300 consists of two actions: syndrome regeneration and comparing 302, performed by the expected syndrome generator and comparator 226; and parity generation 304, performed by parity generators 208, 210, 212, and 214, which occur in parallel at the same time. The second step 310 consists of two actions: bit error decoding 312 performed by the bit error decoder 228; and byte error decoding 314, performed by byte error decoder 230, which occur in parallel at the same time. The third step 320 consists of two conditional actions: block 322 tests whether the bit error decoding action decoded an error, if so block 324 corrects the data, and block 326 tests whether the byte error decoding action decoded an error, if so block 328 corrects the parity. Blocks 322 and 324 are implemented by the bit corrector 242. Blocks 326 and 328 are implemented by the xor gates 250, 252, 254, and 256. Both of the actions in the third step 320 occur in parallel at the same time. The fourth step 330 consists of two actions: driving the data onto the data bus 332, performed by the data bus driver 248; and driving the parity onto the parity bus 334, performed by the parity drivers 258, 260, 262, and 264. These two actions occur in parallel at the same time.

We claim:

1. A computer system having a system bus electrically connected to a memory system and having data error detection and correction between said memory system and said system bus, said computer system comprising:
   (a) a data portion and a parity portion within said system bus, said parity portion representing the parity of said data portion of said system bus;
   (b) digital words within said memory system, said digital words comprising a data portion and an ECC syndrome portion, wherein said syndrome portion represents the syndrome of said data portion of said digital words;
   (c) an ECC checker/corrector with an input coupled to said memory system to receive said digital words from said memory system, and an output coupled to said data portion of said system bus, for checking and correcting said data portion of said digital words before they are transmitted to said system bus, and for generating at least one error output indicative of whether an error has been corrected; and
   (d) a parity generator, having an input coupled to said data portion of said digital words, for generating a parity data output; and
   (e) a parity correction circuit, having an input coupled to said parity data output, and an output coupled to said parity portion of said system bus, said parity correction circuit correcting said parity data output when said error output of said ECC checker/corrector indicates a corrected error.

2. The system of claim 1 where said parity correction circuit is at least one xor gate which xors said parity data with said error output.

3. The system of claim 1 where said EGG checker/corrector has the same number of error outputs as said parity generator has output bits, the different parity bits and error output bits being related and generated off the same portion of said digital word from said memory system; and where said parity correction circuit corrects only the bit of said parity data indicated by the related error output.

4. The system of claim 2 where said EGG checker/corrector has the same number of error outputs as said parity generator has output bits, the different parity bits and error output bits being related and generated off the same portion of said digital word from said memory system; and where said parity correction circuit corrects only the bit of said parity data indicated by the related error output.

5. A computer system having a system bus electrically connected to a memory system and having data error detection and correction between said memory system and said system bus, said computer system comprising:
   (a) a data portion and a parity portion within said system bus, said parity portion representing the parity of said data portion of said system bus;
   (b) digital words within said memory system, said digital word comprising a data portion and an ECC syndrome portion, wherein said syndrome portion represents the syndrome of said data portion of said digital word;
   (c) data correction means for correcting certain errors in said digital words and providing corrected data, said corrected data being coupled onto said data portion of said system bus;
   (d) parity generation means for generating a parity signal indicative of the number of set bits in said corrected data, said parity signal being coupling to said parity portion of said system bus;
   (e) said parity generation means further including means for generationg a trial parity signal from said data portion of said digital words, and means for selectively correcting said trial parity signal when said data correction means corrects an error thus providing the parity signal.

6. The system of claim 5 where said means for selectively correcting said trial parity is an xor gate.

7. The system of claim 5 where said data correction means corrects all single bit errors.

8. The system of claim 6 where said data correction means corrects all single bit errors.

9. The system of claim 5 where said data correction means and said parity generation means operate in parallel.

* * * * *